Oct. 25, 1966   C. L. SEEFLUTH   3,281,303
PROCESS AND APPARATUS FOR SEALING
Filed May 24, 1962
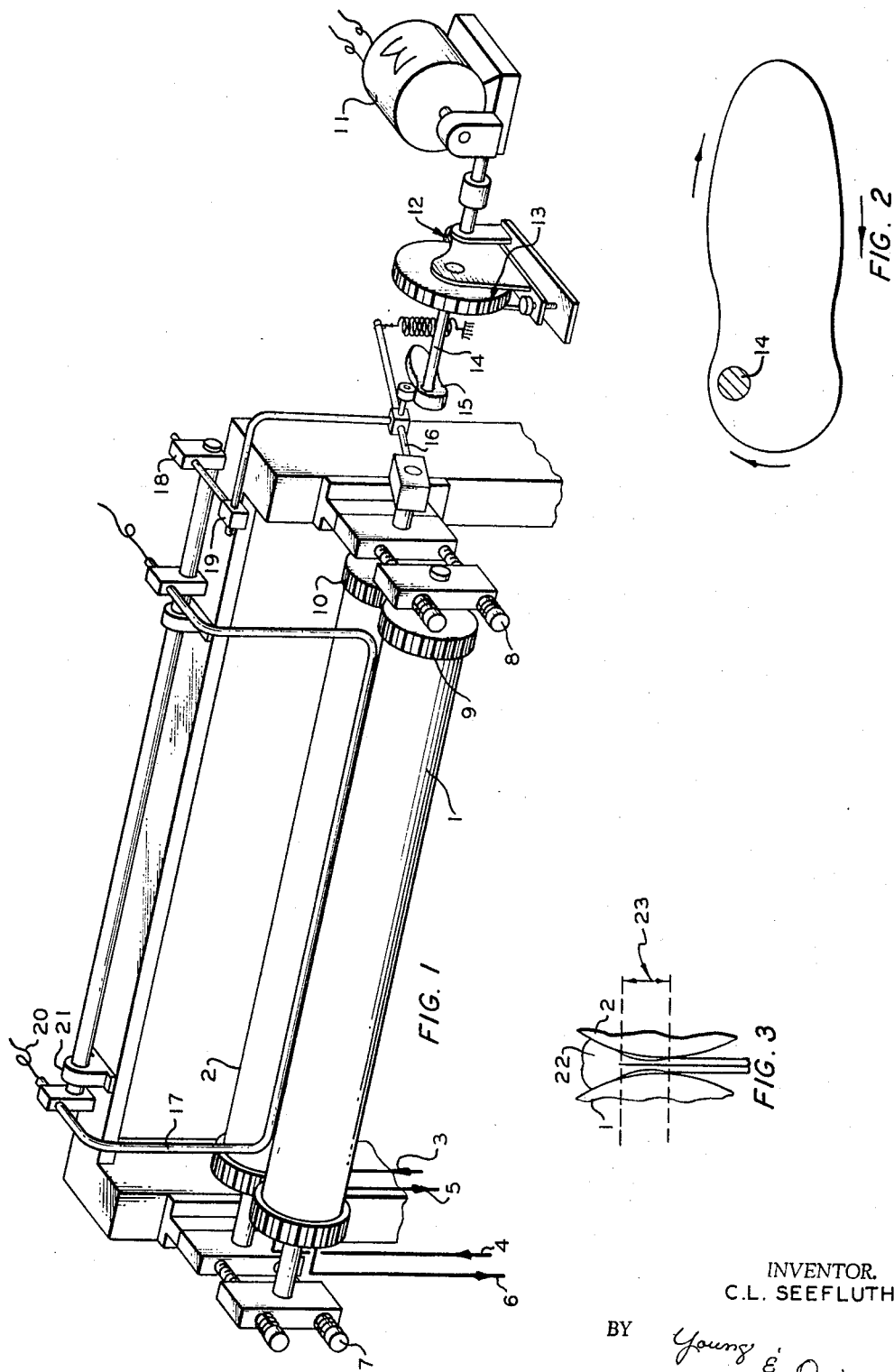
INVENTOR.
C.L. SEEFLUTH
BY Young & Quigg
ATTORNEYS

United States Patent Office 3,281,303
Patented Oct. 25, 1966

3,281,303
PROCESS AND APPARATUS FOR SEALING
Charles L. Seefluth, Bartlesville, Okla., assignor to Phillips Petroleum Company, a corporation of Delaware
Filed May 24, 1962, Ser. No. 197,521
5 Claims. (Cl. 156—282)

This invention relates to a method and apparatus for sealing thermoplastic materials. In one aspect this invention relates to a method for forming of thermoplastic sealed items having strengthened seals by establishing a temperature gradient across the area of thermoplastic serving to form the desired seal. In another of its aspects, the invention relates to a novel apparatus for establishing the requisite temperature gradient across the film to be sealed.

Ordinary high density polyethylene film is blown or cast from the melt temperature and has no orientation in the transverse direction and very little in the machine direction. When completely unoriented it has a tensile strength of about 4,000 p.s.i. It has very little memory of its former state and when reheated to the melting point does not shrink or change shape appreciably nor does it lose any of its tensile strength by reheating and cooling. On the other hand, bioriented film is made from an extruded tube which is cooled and then reheated up to just below its melting point and blown into film which is stretched in all directions in the plane of the film and cooled, which imparts biaxial orientation that may be as high as 28,000 p.s.i. in both the machine and transverse directions. If this film is reheated to the melting point, it tries to return to the structure it had in the cool extruded tube; that is, it shrinks in both dimensions of the plane of the film and tends to thicken back to the dimension of the undrawn tube. When cooled, it is then unoriented and no stronger than unoriented film, or approximately 4,000 p.s.i. Therefore, by any conventional means of sealing, bioriented film can be no stronger than unoriented film immediately adjacent to the seal. The only way a seal can be as strong as the oriented film is to have a transition section between the fused portion of the film and the parent film wherein a gradually thicker cross section offsets the gradually diminishing orientation. For example, if a film has an oriented strength of 24,000 p.s.i. tensile, the unoriented portion of the film must be at least six times as thick to have equivalent strength at 4,000 p.s.i. However, it is possible to produce this necking of the film in respect to thickness without having the accompanying gradient of orientation necessary to balance strength. This occurs when excessive heat employed in the fused portion is not balanced by adequate cooling in the neck portion of the film. In other cases an adequate orientation gradient is obtained as well as physical thickening, but the thickened portions of the film pair are not hot enough to bond to each other. Thus a critical set of conditions is required which cannot be maintained along the length of the seal when trying to control the seal strength by heat input alone.

I have now discovered that by putting more than enough heat into the edges of the film and controlling the heating and cooling on the sides of the film such that a heat transfer gradient is obtained through the plane of the film there can be achieved the desired sealing of the biaxially oriented film. Also, by introducing the film between cold rollers and heating the edges in the crevice between the rollers there is satisfied the critical conditions required.

Thus it is an object of the present invention to provide a new and improved method and apparatus for forming a seal or weld on the edge of one sheet or layer of thermoplastic material such as biaxially oriented polypropylene to the edge of another sheet or layer so as to leave a gas-, moisture- and waterproof seam or bond that is stronger than the material itself. Another object of this invention is to provide thermoplastic containers such as envelopes, bags and the like having strengthened closures or seals. A still further object of this invention is to provide a method and apparatus to form a smooth edge seam on sheets or layers of biaxially oriented thermoplastic, such as biaxially oriented polyethylene.

Other objects, aspects, and the several advantages of this invention will become apparent from the following description taken in connection with the accompanying drawings and the appended claims.

FIGURE 1 is a view of the sealing apparatus of this invention.

FIGURE 2 is a view of the timing cam for controlling the sealing operation.

FIGURE 3 illustrates the improved seal obtained by the present invention.

As shown in FIGURE 1, there is provided two cooled rollers, 1 and 2 with conduits 3 and 4 for introduction of a cooling medium to the interior of the rollers. Conduits 5 and 6 are adapted to remove coolant from the rollers. The two rollers are set in spring loaded supports 7 and 8 which serve to hold the two rollers adjacent so as to keep the teeth of gears 9 and 10 meshed. Motor 11 actuates gear 12 which in turn actuates gear 13 attached to shaft 14 so as to revolve timing cam 15. Timing cam 15 is so designed as to regulate the introduction, heating and rejection time of the film. Heating bar 17 is so adapted in mounts 21 and by connections 18 and 19 to spring held lever 16 that simulanteously with the rotating of gears 9 and 10 bar 17 is raised from its illustrated position in the crevice formed by the two rollers 1 and 2.

Heating bar 17 comprises an elongated metal sheath which contains resistance coil 20 centrally located through the length of the sheath and insulation around same. While use of a heating bar is preferred, the necessary heat required in forming the seal of this invention may be obtained by utilizing hot air or radiant heat. However, it has been found that a heated bar such as element 17 is most desirable due to its ease of operation and simplicity of design.

In operation, rollers 1 and 2 are maintained in a cooled state by the use of a coolant medium which is circulated therethrough by conduits 3, 4, 5 and 6. When bar 17 has been adequately heated, generally to about 775–900° F., motor 11 is started which then by the provided gear arrangement rotates timing cam 15 which regulates the rate of advance and retraction of the film. The film is fed into the rollers whereupon it is picked up by same and in response to the action of the timing cam is fed into the crevice area formed by the rollers a sufficient distance so as to form the desired seal. The timing cam serves to urge the film into the crevice area at such a rate that as the exposed edges of the film are melted, there is assured a sufficient amount of film to support the shrinking and sealing action. After the seam is formed the rollers rotate by means of gears 9 and 10 in such a manner as to retract the film from between same. This rotating action further serves to compress the resulting seal. After removal of the sealed film the apparatus is then in position for repeating the operation.

As shown in FIGURE 2, timing cam 15 is provided with an off-center means for attachment to shaft 14. The cam is so designed that its relative position with regard to lever 16 regulates the introduction, heating and expulsion of the film.

As shown in FIGURE 3, the film between rollers 1 and 2 forms a bead by shrinking of the film into the crevice formed by the rollers and results in fused section 22 of the thus heated film. Due to structure of the crevice formed by the rollers there is established a transition zone 23 wherein the film passes from a completely unoriented state progressively to the unaltered biaxially oriented state. When the rollers rotate to expel the film the fused zone is compressed and the resulting flattened fused bead gives a seal having increased strength.

The following example will serve to further illustrate the present invention.

EXAMPLE

Eighteen-inch lay-flat bioriented blown tubing made from a 60 percent blend solution polymer with a melt index of 5 and 40 percent particle form polyethylene, having a melt index of <1, having a thickness of 3.5 to 4.5 mils, and having a tensile strength of 12,000 p.s.i. in both the machine and transverse directions was sealed in accordance with the subject invention.

Test strips were taken of this seal and pulled in a tensile tester whose clamping jaws moved apart at the rate of 20 inches per minute. The film failed at 12,000 p.s.i. without reaching the strength of the seals.

Eighteen- by thirty-inch bags were made from 1.5 mil 18-inch lay-flat biaxial oriented blown tubing made from solution polyethylene having a melt index of .2 and tensile strengths in the machine and transverse directions of 28,000 p.s.i. and 24,000 p.s.i., respectively.

Bags sealed by the method of this invention were filled with 44 pounds of plastic pellets and edge-dropped to place the maximum hoop stress from impact across the seal. The seals did not fail from repeated drops from 11 feet to a concrete floor. Eventual failure was due to film tearing and was independent of the seal. Bags made from this same film but sealed by conventional means and subjected to the drop tests failed in the area adjacent the seal where orientation of the film had been destroyed by the sealing heat.

*Table.—Burst test of P.E. film*

| | P.s.i. |
|---|---|
| Unoriented film | 4,500 |
| Biaxially oriented film—Gable seal | 5,000 |
| Biaxially oriented film and roller formed seal | 17,000 |

From the above it can be seen that by sealing thermoplastic material by the method and apparatus of this invention so as to provide a transition zone in the sealed portion of the film there is achieved an improved seal having a bursting strength considerably higher than that achieved by more conventional techniques in the art.

As will be evident to those skilled in the art, various modifications of this invention can be made, or followed, in the light of the foregoing disclosure and discussion without departing from the spirit or scope thereof.

I claim:

1. The process of joining together marginal portions of sheets of film of biaxially oriented thermoplastic material which comprises placing marginal portions of sheets of the film in face-to-face relationship between rotatable roller members defining a continuous clamping area and diverging portions defining an open longitudinal cavity with outer free edges of said marginal portions extending from said open cavity and spaced a predetermined distance therefrom, cooling said clamping members whereby said cavity defining portions are cooled, applying heat to the extending marginal portions of said film to melt same back into said open cooled cavity, conducting excess heat away from the clamping members to restrict the melting to the free marginal portions in and extending from said open cavity whereby the sheets clamped between said clamping members are protected against distortion from the heat and the sides of said melted material in said cavity are cooled and solidified, discontinuing the application of heat to said thermoplastic material in said cavity, continuing the cooling of said melted thermoplastic material whereby it sets to form a joint for the film substantially of the shape of said cavity and having a transition zone therein, and then reversing the direction of rotation of said rotatable roller members to release the joined sheets from clamped engagement therebetween and simultaneously pressing the resulting joint for the film.

2. The process of claim 1 wherein said biaxially oriented thermoplastic material is biaxially oriented polyethylene film.

3. Apparatus for joining together marginal portions of laminae of biaxially oriented thermoplastic material comprising elongated roller means for engaging said laminae on opposite sides with marginal portions of said laminae in flat face-to-face engagement and free edges thereof substantially aligned and in spaced relationship to said roller means, means cooling said roller means, said roller means forming a substantially V-shaped cavity from which said marginal portions extend, means applying pressure to said roller means to clamp said laminae therebetween adjacent said V-shaped cavity apex, heating means adjacent the edges forming said cavity along the path wherein said laminae are clamped by said rollers for heating said extending marginal portions to approximately the melting point of said biaxially oriented thermoplastic material, means to discontinue heating said laminae and means to reverse the direction of rotation of said roller means so as to release said laminae after having pressed the resulting joint.

4. The apparatus of claim 3 wherein the heating means comprises an elongated tubular radiant heater so adapted as to rest adjacent to and along said V-shaped cavity during the time required for heating the thermoplastic material.

5. The apparatus of claim 4 wherein the roller means has adapted thereto a timing means for regulating the period during which the heating is applied to the biaxially oriented thermoplastic material.

References Cited by the Examiner
UNITED STATES PATENTS 2,488,212  11/1949  Lloyd.
3,066,064  11/1962  Pommer _____ 156—498 X EARL M. BERGERT, *Primary Examiner.*

J. J. BURNS, H. F. EPSTEIN, *Assistant Examiners.*